UNITED STATES PATENT OFFICE.

WILLIAM LLOYD GALE, OF MEMPHIS, MISSOURI, ASSIGNOR OF ONE-HALF TO OTIS GALE AND RILEY GALE, OF SANTA ROSA, CALIFORNIA.

COMPOUND FOR WELDING CAST-IRON.

SPECIFICATION forming part of Letters Patent No. 496,116, dated April 25, 1893.

Application filed December 17, 1892. Serial No. 455,499. (No specimens.)

*To all whom it may concern:*

Be it known that I, WILLIAM LLOYD GALE, a citizen of the United States, residing at Memphis, in the county of Scotland and State of Missouri, have invented certain new and useful Improvements in Compounds for Welding Cast-Iron; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in welding compounds, and it has for its special object to provide a compound which is specially adapted for use in welding cast iron.

I manufacture my compound in the manner hereinafter described, of the ingredients and in substantially the proportions stated; viz:—I take one half pound of borax, two and one half ounces of sal-ammoniac, two ounces of prussiate of potash, two and one fourth ounces of resin, one half ounce of iron or steel filings, and mix the same in one fourth of a pint of water. This compound is boiled over a slow fire, until dry, after which it is reduced to a fine powder, and is applied to the surfaces to be welded, in the same manner as borax is commonly applied in welding steel.

By the use of my compound, as above specified, I have found it possible to secure perfect results in welding together broken parts of cast iron, securing in all cases perfect union of the parts; a result which has not heretofore been satisfactorily accomplished by the old processes, and by the use of welding compounds which have been applied in the welding of steel and other metals.

Having thus described my invention, what I claim to be new, and desire to secure by Letters Patent, is—

1. A welding compound consisting of borax, sal-ammoniac, prussiate of potash, resin, steel filings, in the proportions substantially as specified.

2. A welding compound consisting of borax, sal-ammoniac, prussiate of potash, resin, and steel filings in the form of a powder, substantially as described.

In testimony whereof I affix my signature in presence of two witnesses.

WILLIAM LLOYD GALE.

Witnesses:
C. F. SANDERS,
I. J. MOODY.